US008622080B2

(12) United States Patent
Pucher

(10) Patent No.: US 8,622,080 B2
(45) Date of Patent: Jan. 7, 2014

(54) PRESSURE REDUCER

(75) Inventor: Peter Pucher, Judendorf Straßengel (AT)

(73) Assignee: MAGNA STEYR Fahrzeugtechnik AG & CO KG, Graz (AT)

( * ) Notice: Subject to any disclaimer, the term of this patent is extended or adjusted under 35 U.S.C. 154(b) by 2 days.

(21) Appl. No.: 13/331,002

(22) Filed: Dec. 20, 2011

(65) Prior Publication Data

US 2012/0161048 A1   Jun. 28, 2012

(30) Foreign Application Priority Data

Dec. 22, 2010 (DE) .......................... 10 2010 055 747

(51) Int. Cl.
*F16K 31/14* (2006.01)

(52) U.S. Cl.
USPC ................. 137/495; 137/505.14; 251/129.02; 251/129.21; 251/321; 251/325

(58) Field of Classification Search
USPC ............ 137/495, 505.14, 505, 505.38, 505.4; 251/129.02, 321, 325, 129.21, 332
See application file for complete search history.

(56) References Cited

U.S. PATENT DOCUMENTS

| 3,115,891 A | * | 12/1963 | Kimm ............................ 137/495 |
| 3,179,123 A | * | 4/1965 | Kowalski et al. ............. 137/495 |
| 4,206,781 A | * | 6/1980 | Salter ............................. 137/504 |
| 4,341,370 A | * | 7/1982 | Banks ............................ 251/282 |
| 5,213,132 A | * | 5/1993 | Comment ................. 137/505.25 |
| 5,556,175 A | * | 9/1996 | Hayakawa et al. ........ 303/119.2 |
| 5,618,025 A | * | 4/1997 | Barron et al. ................. 251/210 |
| 7,077,299 B2 | * | 7/2006 | Amidzich ..................... 222/518 |
| 7,708,255 B2 | * | 5/2010 | Conrad ......................... 251/333 |
| 8,413,955 B1 | * | 4/2013 | Rooney ......................... 251/171 |
| 2004/0178378 A1 | * | 9/2004 | Collins et al. ............ 251/129.15 |

FOREIGN PATENT DOCUMENTS

| CN | 101122343 A | * | 2/2008 |
| DE | 102008020019 A1 | * | 10/2009 |
| EP | 461081 A1 | * | 12/1991 |
| WO | 9608668 A1 | * | 3/1996 |

\* cited by examiner

*Primary Examiner* — John K Fristoe, Jr.
*Assistant Examiner* — Jessica Cahill
(74) *Attorney, Agent, or Firm* — Jordan IP Law, LLC; Todd A. Vaughn

(57) ABSTRACT

A pressure reducer having a high pressure inlet, a low-pressure outlet and a valve having a valve seat and a cooperating movable piston valve. With displacement of the piston valve away from the valve seat, a path between the high pressure inlet and the low pressure outlet is opened. In addition, a closing force caused by a low pressure acts on the piston valve towards the valve seat during operation of the pressure reducer. A spring is also provided for the purpose of exerting an actuating force on the piston valve to move away from the valve seat in the valve opening direction. A solenoid coil is configured to exercise a magnetic force superimposed on the closing force or the actuation force acting on the valve piston.

19 Claims, 1 Drawing Sheet

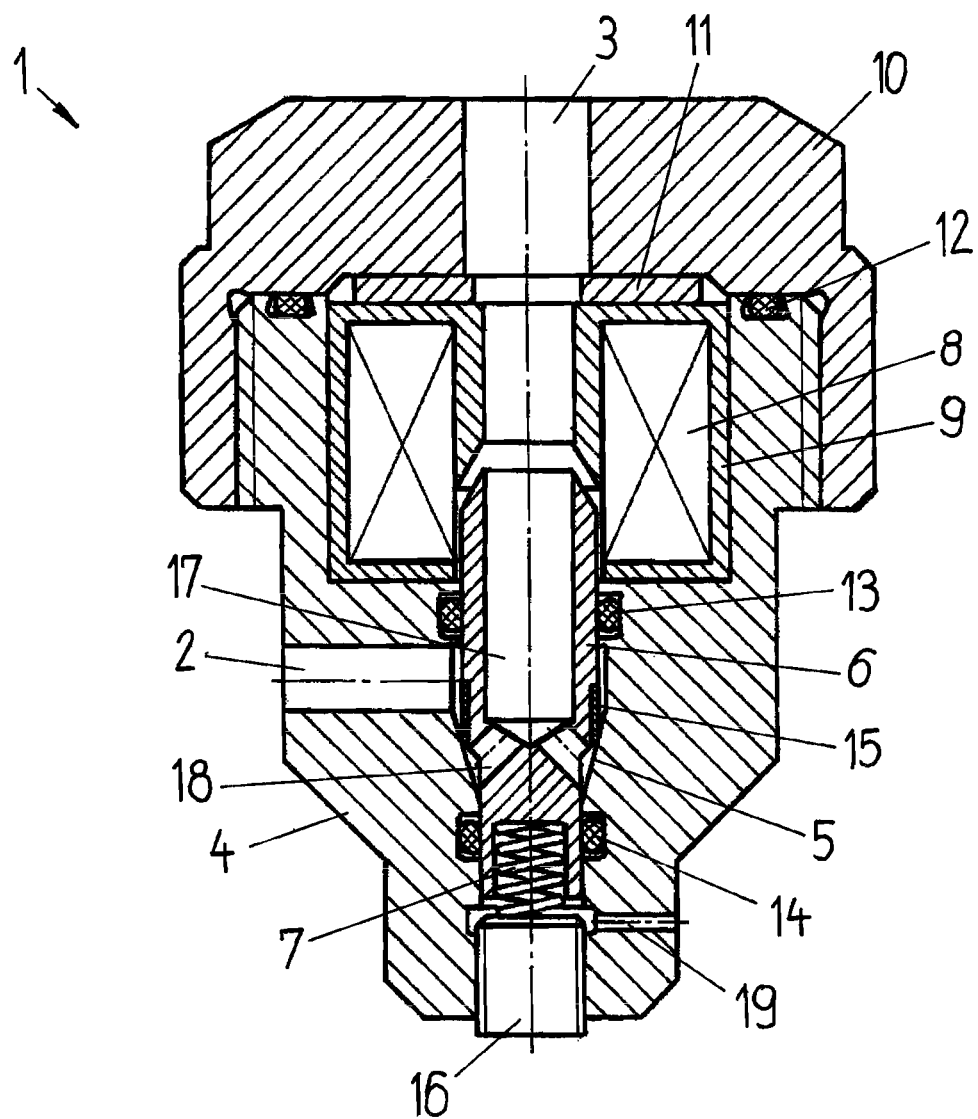

PRESSURE REDUCER

CROSS-REFERENCE TO RELATED APPLICATIONS

The present application claims priority under 35 U.S.C. §119 to German Application No. DE 10 2010 055 747.1 (filed on Dec. 22, 2010), which is hereby incorporated by reference in its entirety.

FIELD OF THE INVENTION

The present invention relates to a pressure reducer that includes a high pressure inlet, a low-pressure outlet and a valve having a valve seat and a movable valve piston cooperating with it. The valve piston opens a path between the high-pressure inlet and the low-pressure outlet by moving away from the valve seat. Moreover, a closing force caused by a low pressure acts on the valve piston towards the valve seat during the operation of the pressure reducer. The valve piston includes an effective surface transversely oriented to the direction of displacement and facing towards the low pressure outlet such that the closing force acts upon it. Finally, the pressure reducer includes a spring which is designed to exert an actuating force on the valve actuating piston, which acts away from the valve seat.

BACKGROUND OF THE INVENTION

Pressure reducers are generally used to reduce the pressure of a fluid (e.g., liquid or gaseous). They are usually installed in the course of a pipeline, so that, at the high pressure inlet, the pressure is even higher, but the low pressure outlet is at a lower pressure. For example, the pressure in a water pipe or the pressure from a compressed air bottle or gas bottle is reduced to a desired extent with a pressure reducer or pressure controller of the type mentioned above.

In addition, pressure reducers are also known from the prior art, which can be actuated electromagnetically. For example, EP 1 209 336 A2 discloses a pressure reducer for a gas injection system for a methane-fueled internal combustion engine. Here, a valve piston which is pressed against a valve seat by a spring is lifted electromagnetically to open the valve. In the rest state, the valve is, therefore, closed because of the spring. The pressure at the low-pressure outlet can be set using pulse width modulation, i.e., variation of the ratio of the time when the valve is open and the time in which the valve is closed. Strictly speaking, this device is not, however, a pressure reducer of the type mentioned, but because the valve is normally closed in the idle state owing to the spring, it is a conventional solenoid valve which is operated as a pressure reducer.

U.S. Pat. No. 6,202,697 B1 further discloses a valve for pressure reduction, which has a high pressure inlet, a low pressure inlet and a load output. An electromagnetically actuated piston valve connects the load output to the high-pressure inlet or to the low pressure inlet. In this apparatus, because of the many connections, this is not a pressure regulator in the traditional sense with a high pressure inlet and a low pressure outlet.

From DE 10 2008 020 019 A1, a solenoid valve is known with a valve housing having a valve closure body and a solenoid actuator unit controlling the valve closure body, whereby the valve closure body has an operative connection to a valve seat and controls the flow cross section between a high pressure port on the valve housing and a low pressure port on the valve housing as an extension of the valve seat, and whereby a compression spring is arranged in the vicinity of the valve seat and/or the low-pressure port and is supported on the valve housing. The other end of the compression spring acts upon the valve closure body in the opening direction against the closing force of the solenoid actuator unit. A sealing element is located between the valve housing and the valve closing body on its region facing away from the valve seat.

DE 37 41 526 A1 discloses a poppet valve, especially when used as a relief valve for controlling the start and end of delivery of fuel injection pumps, with a valve chamber contained in a valve casing, a valve aperture that divides the valve chamber into a high-pressure chamber and a discharge chamber, a valve seat enclosing the valve aperture, a valve element that interacts with the valve seat to close and open the valve aperture, which rests with a closure surface tight against the valve seat in the valve closed position and is subjected to high pressure in the valve opening direction when in that position, and carries a control surface loaded by the high pressure in the valve closing direction, and with an electrical actuator, in particular an electromagnet, which actuates the valve element.

SUMMARY OF THE INVENTION

An object of the invention is to provide an enhanced pressure reducer, in particular, one in which the pressure at the low-pressure outlet can be varied very quickly and can be controlled remotely, in which, however, the basic functionality is always maintained even in the absence of external intervention.

Embodiments of the invention is achieved by a pressure reducer of the type aforementioned, additionally including a solenoid coil, which is configured to exert a magnetic three superimposed on the closing force or the actuation force and acting on the valve piston.

In accordance with the invention, this results in a pressure reducer in which the pressure at the low pressure outlet can be modified very quickly by applying a voltage to the solenoid coil. Various disturbance effects (e.g., friction, temperature, flow, etc.) can be compensated for by detecting the pressure at the outlet of the pressure regulator and by appropriate control of the magnetic force. With cables of suitable length, the pressure can also be varied by remote control.

It is also conceivable that the pressure reducer can be configured with a remote power source and a radio module and in this way can be controlled remotely. Without external intervention, for example, if the remote control fails, a basic functionality is still retained. The pressure regulator then controls the pressure at the low pressure outlet purely mechanically at a previously set level. The pressure reducer according to the invention is therefore extremely failsafe.

Advantageous embodiments and further developments of the invention arise from the dependent claims and from the description taken in conjunction with the figures.

It is advantageous if the solenoid coil is arranged relative to a magnetic armature acting on the valve piston or connected to it so that the magnetic force acts in the opening direction of the valve. In particular, the magnetic armature is arranged to move towards the low pressure outlet. In this embodiment, the pressure on the low side can be increased by applying a voltage to the solenoid coil. If this control function is not available, then the pressure is independently regulated to a lower and thus safer pressure level.

It is advantageous if the valve piston itself is designed as a magnetic armature. In this way, a separate component that functions as a magnetic armature can be dispensed with. The pressure reducer in accordance with the invention has only a few components and is, therefore, comparatively easy to assemble. Moreover, the pressure reducer can also be produced in a very compact form.

It is also advantageous if the force acting on the valve piston and caused by the solenoid coil is no more than half as large as the actuation force exerted by the spring. In this way, the need for excessive currents for electromagnetic actuation of the valve piston is eliminated. In addition, the pressure differences between the electromagnetically controlled state and the uncontrolled state are not so great, so that in the event of a failure of the electromagnetic controller, no excessively high and unwanted pressure waves can occur in the pipe system in which the pressure reducer according to the invention is installed.

It is also advantageous if a through opening is provided in the valve piston, which connects the high pressure inlet and the low pressure outlet with the valve in the open state. In this way, the pressure reducer can be particularly compactly constructed, since there is no need to provide a through opening between the high pressure inlet and the low pressure outlet in the valve body itself. The valve piston thus fulfills a dual function.

It is particularly advantageous if the contact surface between the valve seat and the valve piston is in the form of a metal-plastic combination. A particularly good sealing effect of the valve can be achieved with this variant of the invention. For example, the sealing surface on the valve piston can be made of plastic, while the valve seat can be composed of, for example, brass or stainless steel. However, a reverse configuration is possible. In this case, the valve piston is made of metal in the vicinity of the valve seat, whereas the valve seat is made of plastic.

It is also particularly advantageous if the valve piston is designed so that the high pressure inlet is only facing one radial surface of the valve piston with the valve in the closed state. In this way the pressure occurring on the high pressure side can exert no pressure on the valve piston, which acts in its displacement direction. The pressure acting on the high pressure side, therefore, has practically no influence on the pressure level on the low pressure side.

It is beneficial when an opening cross section of the valve increases in proportion to a displacement of the valve piston away from the valve seat. In this way, the control characteristic of the pressure reducer is designed to be more or less linear. The pressure is, therefore, controlled with the same precision over the entire range.

It is also beneficial when the valve piston is guided in a valve body containing the valve seat and a sealing ring (e.g., O-ring) is arranged between the valve piston and valve body, one between the high pressure inlet and the low pressure outlet and another between the high pressure inlet and a region around the pressure reducer. This allows leakage to be prevented between the high pressure inlet and the low pressure outlet and between the high pressure inlet and the region around the pressure reducer.

It is advantageous if the sealing rings contact the valve piston/valve body at one and the same part of the valve piston/valve body. In this way leakage problems, which arise as a result of accumulated component tolerances as a result of the assembly of several different components, can be avoided.

Finally, it is advantageous if the maximum cross section of the valve opening is smaller than the other flow cross sections between the high pressure inlet and the low pressure outlet. It is particularly advantageous in this context if the maximum valve opening cross-section of the valve is no more than half as large as the rest of the flow cross sections between the high pressure inlet and the low pressure outlet. In this way, it is ensured that the pressure is controlled solely by displacement of the valve piston and an (additional) constriction does not interfere with this pressure regulation or even make it impossible.

The above embodiments and modifications of the invention can be combined in any way.

BRIEF DESCRIPTION OF THE DRAWINGS

The present invention is further illustrated by the embodiment shown in the schematic drawing in the figure.

FIG. 1 illustrates a cross-sectional view of a pressure reducer in accordance with the invention.

DETAILED DESCRIPTION OF EMBODIMENTS

Initially it will be noted that in the figures, identical and similar parts are designated with the same reference numerals and functionally similar elements and features, unless otherwise specified, are designated with the same reference numerals but with different indices.

It is further noted that specifying positions such as "top," "bottom," "lateral," "horizontal," "vertical" and the like refer to the illustrated position of the same pressure reducer. When the position of the regulator changes, the location information is to be correspondingly adapted intellectually.

FIG. 1 illustrates a cross-section through a pressure reducer 1 in accordance with the invention with a high pressure inlet 2 and a low pressure outlet 3. The pressure reducer 1 includes a valve body 4 having a valve seat 5 and a valve piston 6, which is mounted in the valve body 4 so as to be moveably displaceable in a displacement direction (in this case vertical). Furthermore, the pressure reducer 1 includes a spring 7, which pushes the piston valve 6 away from the valve seat 5. The pressure reducer 1 also includes a solenoid coil 8, which is arranged in a coil housing 9. The coil housing 9 is inserted into the valve body 4 and is held in the valve body 4 using a nut 10, which presses on the coil housing 9 via a washer 11.

A sealing ring 12 is provided to seal between the valve body 4 and the nut 10. Furthermore, a sealing ring 13 between the valve piston 6 and the valve body 4 is arranged between the high pressure inlet 2 and the low-pressure outlet 3. Between the high pressure inlet 2 and a region around the pressure reducer 1, another sealing ring 14 is arranged between the valve piston 6 and the valve body 4. The sealing rings 12, 13 and 14 may be in the form of O-rings, for example. Preferably, the sealing rings 13 and 14 contact the valve piston 6 and/or the valve body 4, as illustrated in FIG. 1, at one and the same part of the valve piston 6 or at one and the same part of the valve body 4, so that the mounting tolerances of different components cannot affect the sealing action of the sealing rings 13 and 14.

Furthermore, a plastic sleeve 15 is mounted on the valve piston 6 in the area of the valve seat 5, which ensures an enhanced seal interface between the valve piston 6 and the valve body 4, which, for example, is made of brass, stainless steel or other metal. It is also conceivable, of course, that the valve seat 5 is made of a plastic. In this case, the plastic sleeve 15 on the valve piston 6 can be omitted.

The pressure reducer 1 also includes an adjusting screw 16 which contacts and acts on the spring 7. In addition, the valve piston 6 includes a through hole 17 which fluidically connects the high pressure inlet 2 and the low pressure outlet 3 with the valve in the open state. The openings 18 fluidically connect the through opening 17 to the circumference of the valve piston 6 in the vicinity of the valve seat 5. The pressure reducer 1 also includes a pressure relief opening 19 which fluidically connects the area under the valve piston 6 to the surroundings of the pressure reducer 1.

The operational functionality of the pressure reducer 1 in accordance with the invention illustrated in FIG. 1 is as follows.

The spring 7 exerts a control force on the valve piston 6, which pushes it away from the valve seat 5. The valve is, therefore, opened, and a fluid can flow from the high pressure inlet 2 to the low pressure outlet 3 via the openings 18 and the through-opening 17. If the pressure at the low-pressure outlet 3 increases, the force on the valve piston 6 increases and presses the valve piston 6 against the valve seat 5 in opposition to the spring force or the actuating force. Thus, a certain pressure is set up on the low pressure side, which is so large that the closing force on the valve piston 6 caused by the low pressure and acting towards the valve seat 5 is equal to the actuating force of the spring 7. If the valve is closed again, then the closing force can exceed the actuating force with further increasing pressure on the low pressure side. To set the pressure at the low pressure outlet 3, the spring 7 can be biased to a greater or lesser extent using the adjustment screw 16.

For the illustrated embodiment of the pressure reducing valve 1, the opening cross-section of the valve is proportional to a displacement of the valve piston 6 away from the valve seat 5, so that the control characteristic of the valve is more or less linear. Preferably, the maximum cross section of the valve opening is also less than, even more preferably, no more than half as large as, the rest of the flow cross-sections between high pressure inlet and the low pressure outlet. In this way, it is ensured that the pressure control takes place solely by displacing the valve piston 6 and an (additional) constriction does not undermine this pressure regulation.

The pressure on the high pressure side has practically no influence on the pressure regulation, since the valve piston 6 is designed so that the high pressure inlet 1 is facing only one radial surface of the valve piston 6. The pressure at the high pressure inlet 1, therefore, causes no force in the direction of displacement of the valve piston 6.

If the solenoid coil 8 is now carrying an electric current, then the closing force or the actuating force can be superimposed on a magnetic force acting on the valve piston 6 in the displacement direction.

In the illustrated embodiment, the valve piston 6 itself is designed as a magnetic armature. The solenoid coil 8 is arranged relative to the valve piston 6 configured as an armature piston 6 so that the magnetic force acts in the opening direction. Specifically, in this example the solenoid coil 8 is arranged to be moved toward the low pressure outlet 3. The magnetic force, therefore, acts in the same direction as the actuating force caused by the spring 7, and thus, against the closing force caused by the low pressure. Thus, the pressure at the low pressure outlet 3 can be set at a higher level by controlling the solenoid coil 8 than the level set by the spring 7 and the adjusting screw 16. Preferably, the maximum magnetic force caused by the solenoid coil 8 and acting on the valve piston 6 is no greater than half as large as the actuating force caused by the spring 7. In this variant of the invention, a loss of control capability via the solenoid coil 8 leads to the pressure on the low pressure outlet 3 being regulated to the lower, and therefore, safer pressure level set by the spring 7.

In an implemented embodiment of the pressure reducer 1 in accordance with the invention, the effective piston area (i.e., the area of the valve piston 6 on which the low-pressure acts) and hence the closing force, or the spring force is chosen so (small) that a relatively small magnetic force of approximately 10N is sufficient to achieve a pressure increase of approximately 4 bar. In this way, a particularly compact design of the pressure reducer 1 can be achieved, with only low power consumption of the solenoid coil 8. Of course, the setting of each parameter of the pressure reducer 1 depends on its intended use. A specialist will find a suitable combination of parameters for the given task without any inventive activity.

In FIG. 1, while an advantageous embodiment of the pressure reducer 1 in accordance with the invention is illustrated, it is not the only one possible. It is also conceivable that the valve piston 6 is arranged shifted relative to the solenoid coil 8 in the direction of the low pressure outlet. In this case, a current flowing through the solenoid coil 8 would cause a reduction of the pressure at the low pressure outlet 3. Likewise, it is conceivable that the valve piston 6 itself is not designed as a magnetic armature, but a separate magnetic armature is provided that acts upon or that is connected to the valve piston 6. In this case, the local arrangement of the solenoid coil 8 and the magnetic armature is relevant. Thus, in principle, a pressure increase will be caused if the solenoid coil 8 in the figure is arranged below the valve piston 6 but the magnetic armature is arranged above it.

Finally, the function of the pressure equalization opening 19 is explained. This ensures that no excess pressure can build up in the space under the valve piston 6, which, as indeed the force caused by it and acting on the valve piston 6 is in the same direction as the actuating force caused by the spring 7, would lead to a gradual, unwanted and potentially also unnoticed pressure increase at the low pressure outlet 3.

It should be noted that the components illustrated in FIG. 1 are illustrated partially simplified. In practice, a pressure reducer 1 according to the invention can also differ from the illustration. In particular this may comprise more complex and/or additional components that are not shown here. Finally, it is noted that the illustrations are not necessarily to scale and proportions of real components may differ from the proportions of the components shown.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pressure reducer, comprising:
   a valve having a valve body, a valve seat and a movable valve piston that interacts with the valve seat in an operating state of the pressure reducer;
   a spring provided in the valve body and configured to exert an actuating force on the valve piston such that the valve piston is moved away from the valve seat;
   a solenoid coil configured to exert a magnetic force which is superimposed on at least one of a closing force and the actuating force which acts on the valve piston;
   a high pressure inlet; and
   a low pressure outlet,
   wherein when the valve piston is displaced away from the valve seat, a fluid path is opened between the high pressure inlet and the low pressure outlet, and on the valve piston, during the operating state, the closing force caused by pressure at the low pressure outlet acts towards the valve seat, wherein the valve piston is configured so that the high pressure inlet only faces one radial surface of the valve piston with the valve in the closed state.

2. The pressure reducer of claim 1, wherein the high pressure inlet is at the valve body.

3. A pressure reducer, comprising:
a valve having a valve body, a valve seat and a valve piston that interacts with the valve seat in an operating state of the pressure reducer;
a spring provided in the valve body and configured to exert an actuating force on the valve piston such that the valve piston is moved away from the valve seat;
a solenoid coil providing in the valve body and configured to exert a magnetic force which is superimposed on at least one of a closing force and the actuating force which acts on the valve piston;
a high pressure inlet;
a low pressure outlet;
a mechanical fastener that maintains the solenoid coil in the valve body;
a first sealing ring arranged between the valve body and the mechanical fastener;
a second sealing ring arranged between the valve piston and the valve body and also between the high pressure inlet and the low pressure outlet;
a third sealing ring arranged between the high pressure inlet and the surroundings of the pressure reducer,
wherein the valve piston includes a through hole longitudinally extending therethrough which fluidically connects the high pressure inlet and the low pressure outlet when the valve is in an open state,
wherein the second sealing ring and the third sealing ring respectively contact the valve piston.

4. The pressure reducer of claim 3, further comprising:
a sleeve mounted on the valve piston in an area adjacent the valve seat and configured to maintain a seal between the valve piston and the valve body.

5. The pressure reducer of claim 3, further comprising:
an adjusting device which contacts and acts on the spring to adjust the bias force of the spring.

6. The pressure reducer of claim 3, further comprising:
openings provided in the valve body and configured to connect the through hole of the valve piston to the circumference of the valve piston in an area adjacent the valve seat.

7. The pressure reducer of claim 3, wherein when the valve piston is displaced away from the valve seat, a fluid path is opened between the high pressure inlet and the low pressure outlet, and on the valve piston, during the operating state the closing force caused by low pressure acts towards the valve seat.

8. A pressure reducer, comprising:
a high pressure inlet;
a low pressure outlet;
a valve with a valve seat and a movable valve piston that interacts with the valve seat in an operating state of the pressure reducer, which, when displaced away from the valve seat, opens a fluid path between the high pressure inlet and the low pressure outlet, and on the valve piston, during the operating state, a closing force caused by pressure at the low pressure outlet acts towards the valve seat, wherein the valve piston is configured so that the high pressure inlet only faces one radial surface of the valve piston with the valve in the closed state;
a spring which is configured to exert an actuating force on the valve piston to a movement away from the valve seat; and
a solenoid coil which is configured to exert a magnetic force superimposed on at least one of the closing force acting towards the valve seat and the actuating force acting on the valve piston.

9. The pressure reducer of claim 8, wherein the solenoid coil is arranged relative to a magnetic armature that is one of acting on the valve piston and connected to the valve piston, such that the magnetic force acts in a valve opening direction.

10. The pressure reducer of claim 8, wherein the valve piston comprises a magnetic armature.

11. The pressure reducer of claim 8, wherein the magnetic force acting on the valve piston and caused by the solenoid coil is no greater than half the magnitude of the actuating force caused by the spring.

12. The pressure reducer of claim 8, wherein the valve piston has a through opening which fluidically connects the high pressure inlet and the low pressure outlet with the valve in the open state.

13. The pressure reducer of claim 8, wherein a contact surface between the valve seat and the valve piston is in the form of a combination of metal and plastic.

14. The pressure reducer as claimed in claim 8, wherein an opening cross-section of the valve increases in proportion to a displacement of the valve piston away from the valve seat.

15. The pressure reducer of claim 8, wherein a maximum opening cross-section of the valve is less than remaining flow cross-sections between the high pressure inlet and the low pressure outlet.

16. The pressure reducer of claim 15, wherein a maximum opening cross-section of the valve is no greater than half of remaining flow cross-sections between the high pressure inlet and the low pressure outlet.

17. The pressure reducer of claim 8, further comprising:
a valve body through which the valve piston is guided, wherein the valve body contains the valve seat;
a first sealing ring arranged between the valve piston and the valve body and also between the high pressure inlet and the low pressure outlet;
a second sealing ring arranged between the high pressure inlet and the surroundings of the pressure reducer.

18. The pressure reducer of claim 17, wherein the first sealing ring and the second sealing ring respectively contact the valve piston.

19. The pressure reducer of claim 17, wherein the first sealing ring and the second sealing ring respectively contact the valve body.

* * * * *